United States Patent

[11] 3,581,238

[72] Inventors Etsujiro Shimemura
    Tokyo;
    Masao Iwamiya, Yokohama-shi, both of, Japan
[21] Appl. No. 763,782
[22] Filed Sept. 30, 1968
[45] Patented May 25, 1971
[73] Assignee The Tsurumi-Seikikosakv-Sho Co. LTD
    Yokohama-shi, Japan
[32] Priority Sept. 30, 1967
[33] Japan
[31] 62756/1967

[54] TRANSMISSION TRANSDUCER FOR REMOTE MEASUREMENT
7 Claims, 6 Drawing Figs.
[52] U.S. Cl.................................................. 331/135,
                                                         331/136
[51] Int. Cl.................................................. H03b 5/20

[50] Field of Search.......................................... 331/135, 136

[56] References Cited
UNITED STATES PATENTS
3,396,346   8/1968   Richman.................... 331/135
OTHER REFERENCES
E. F. Good, "Electronic Engineering", Pgs. 164— 169 April 1957, 331-135

Primary Examiner—John Kominski
Attorney—Flynn and Frishauf

ABSTRACT: A transmission transducer for remote measurement is incorporated in the feedback loop of a double integrator type oscillator. The transducer is adapted to control the frequency of the oscillator corresponding to variations of gains of the transducer. The transducer gain is varied in accordance with variations of measured values which are directly sensed by the transducer.

3,581,238

TRANSMISSION TRANSDUCER FOR REMOTE MEASUREMENT

BACKGROUND OF THE INVENTION

The present invention relates to a transmission transducer for remote measurement and more particularly to improvements in an oscillator-type transmission transducer.

Among the methods of telemetering the data, there is one known as the FM system. This system further includes, for example, (a) a voltage controlled type oscillator, (b) a balanced torque type voltage controlled oscillator and (c) a resistance controlled oscillator.

There will now be described an oscillator-type transmission transducer. To measure values such as those associated with temperature, salinity of sea water, ocean depth, direction and velocity of ocean currents and sound velocity in the water, there is used a primary transducer, for example, a thermistor, an inductive conductivity head, a potentiometer to detect variations in pressure using a bourdon tube or a potentiometer to detect current direction from the rotation angle of a vane. Measured values are proportionally converted to a direct current voltage, which in turn is proportionally converted to a frequency by a secondary transducer, for example, an oscillator, thereby to transmit the measured values.

The aforementioned oscillator must have its frequency controlled in accordance with variations in the range of measured values. To this end, there had been employed a phase control system using a Wien-bridge circuit or a voltage or current control system using a multivibrator.

However, these frequency control systems involved unstable factors such as a direct current amplifier which was subject to severe drifting. Therefore, when they were used in a locality where it was impossible to expect stable environmental conditions, they were unavoidably reduced in the accuracy of measurement as was the case with an ocean telemeter.

The conventional frequency control method was incapable of separately carrying out the adjustment of the center frequency corresponding to the standard measured values and the occupied frequency bandwidth corresponding to variations in the range of measured values. For instance, if it is assumed that outputs from the primary transducer corresponding to variations in the range of measured values have a voltage ranging between $E_0V$ and $E_1V$ and that frequencies from the oscillator corresponding to the aforesaid range of voltage extend from $f_0 c/s$ to $f_1 c/s$, then the voltage of outputs from the primary transducer will be broadened from $E_0V$ to $E_2V$, provided to upper limit of the range of measurement is enlarged. However, due to the intrinsic properties of the oscillator itself, if the upper limit $E_1V$ of the voltage range was changed to $E_2V$, this also varied the center frequency $f_0 c/s$ and the lower limit of the range of the corresponding frequencies, making it impossible to easily obtain an occupied frequency bandwidth of from $f_0 c/s$ to $f_2 c/s$ exactly corresponding to the enlargement of the aforesaid voltage range. To overcome these drawbacks, there has been adopted, for example, a method which consisted in first setting the lower limit voltage $E_0V$ at 0 v. using the balancing conditions of a bridge circuit, and thereafter changing the upper limit voltage $E_1V$ to $E_2V$. However, this method involved a complicated and expensive apparatus and there has been voiced a strong demand for its improvement.

SUMMARY OF THE INVENTION

The present invention provides a transmission transducer for remote measurement, which is incorporated in the loop of a double integrator type oscillator, and which is adapted to control the frequency of the oscillator. Variations of measured values are directly sensed by the transducer, and are directly converted to variations in gain of the transducer. The transducer is coupled in the feedback oscillator circuit so that variations in gain thereof cause correspondingly variations in oscillator frequency. The transducer system can be easily constructed and operated reliably even where environmental conditions change and moreover can control the center frequency and occupied frequency bandwidth independently of each other, affording the advantage of improving the accuracy of measurement and other merits.

DETAILED DESCRIPTION OF THE INVENTION

Figure 1:
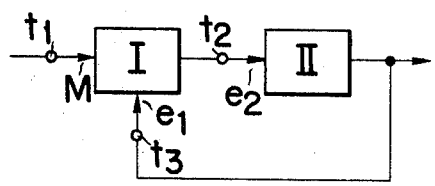
FIGS. 1, 2 and 3 are block diagrams illustrative of the principle of the present invention.

As shown in FIG. 1, the transmission transducer assembly of the present invention consists of a transducer I and oscillator II. To one input terminal $t_1$ of the transducer I are supplied measured values, which are then conducted to the input terminal $t_2$ of the oscillator II. The output terminal of the oscillator II is connected to the other input terminal $t_3$ of the transducer I so as to form a closed loop oscillation circuit including said transducer I.

Figure 2:
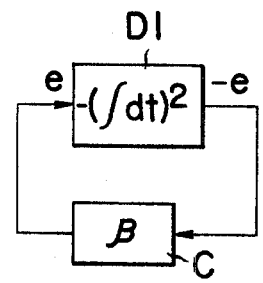

As is well known, a system represented by the following differential equation of the second order $$\frac{d^2e}{dt^2}+\omega^2 e=0 \qquad (1)$$

performs simple harmonic motion of an angular frequency $\omega$. If represented by a clock circuit diagram as shown in FIG. 2, the system which performs simple harmonic motion expressed by the above equation (1) consists of a double integrator DI designated as $-(\int dt)^2$ and a coefficient adjuster C for feeding back outputs therefrom. With the feedback gain of the coefficient adjuster denoted as $\beta$, the angular frequency $\omega$ in the block circuit diagram may be expressed as follows:

$$\omega=\sqrt{\beta} \qquad (2)$$

Figure 3:
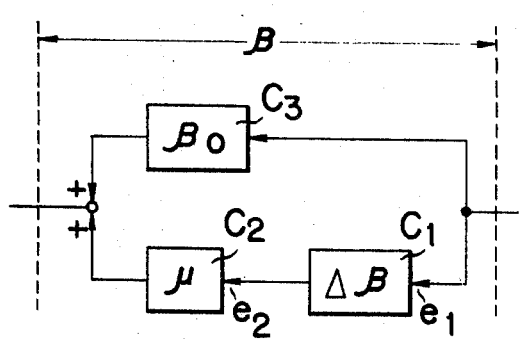
Figure 4:
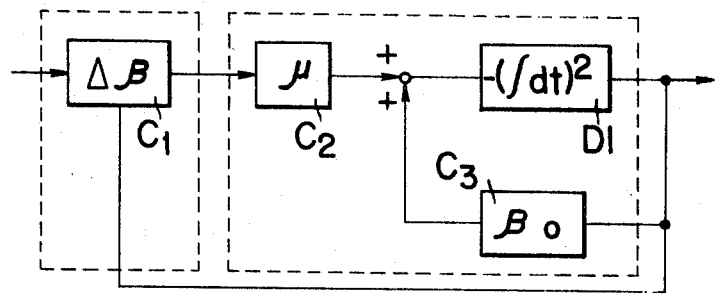
FIG. 4 is a block diagram schematically showing the construction of an apparatus according to the present invention.

Now let it be assumed that as shown in FIG. 3, the coefficient adjuster C of FIG. 2 consists of three component units $C_1$, $C_2$ and $C_3$ and that the gains of these units are designated as $\Delta\beta$, $\mu$ and $\beta_0$ respectively. If the three coefficient adjuster units $C_1$, $C_2$ and $C_3$ of FIG. 3 are incorporated into the coefficient adjuster C of FIG. 2, the resultant circuit will assume a pattern as shown in FIG. 4. The overall gain $\beta$ of the coefficient adjuster C will be $$\beta=\beta_0+\mu\Delta\beta \qquad (3)$$

and the angular frequency $\omega$ thereof will be $$\omega=\sqrt{\beta_0+\mu\cdot\Delta\beta}$$
$$=\sqrt{\beta_0}\cdot\sqrt{1+\mu\frac{\Delta\beta}{\beta_0}} \qquad (4)$$

If $$\mu\cdot\frac{\Delta\beta}{\beta_0}\ll 1,$$

then equation (4) may be approximately expressed as follows by rearranging the equation by Taylor's development to omit the second and subsequent terms.

$$\omega=\sqrt{\beta_0}\cdot\left(1+\frac{\mu}{2}\cdot\frac{\Delta\beta}{\beta_0}\right)$$
$$=\sqrt{\beta_0}+\frac{\mu}{2\sqrt{\beta_0}}\cdot\Delta\beta \qquad (5)$$

The frequency $f$ of signals from the oscillator II and the gains of the respective coefficient adjuster units $C_1$, $C_2$ and $C_3$ forming the external circuit o the oscillator II have a relationship:

$$f=\frac{1}{2\pi}\sqrt{\beta_0+\mu\Delta\beta} \qquad (6)$$

The relationship of frequency to gain is such that the center frequency $f_0$ representing the standard measured values is determined in accordance with the gain $\beta_0$ of the coefficient adjuster unit $C_3$ and that the gain defining the upper limit frequency $f_1$ beyond the center frequency $f_0$, namely, the occupied frequency bandwidth, is fixed in accordance with the product $\mu \cdot \Delta\beta$ of the gains $\mu$ and $\Delta\beta$ of the other coefficient adjuster units $C_2$ and $C_1$, respectively.

Since the first term of equation (5) corresponds to the center frequency, and the second term to the occupied frequency bandwidth, the center frequency may be freely set by adjusting the gain $\beta_0$ of the coefficient adjuster unit $C_3$ and the occupied frequency bandwidth by adjusting the gain $\mu$ of the coefficient adjuster unit $C_2$. Moreover, the present invention enables these adjustments to be carried out separately.

Figure 5:
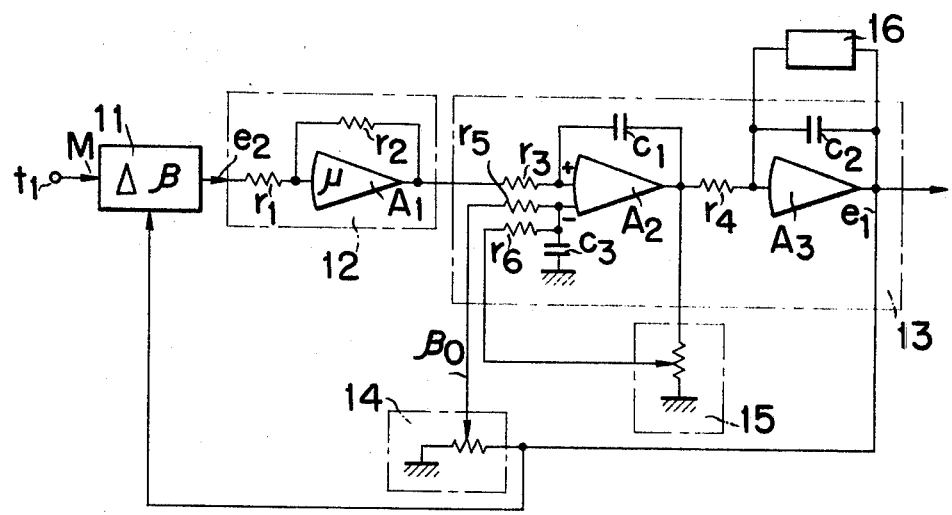
FIG. 5 represents the concrete circuit pattern of the present invention.

There will now be described the concrete block circuit diagram of FIG. 4 by reference to FIG. 5. To the input terminal $t_1$ of the primary transducer 11 are supplied measured amounts (or values) M. Outputs $e_2$ from the primary transducer are conducted to the circuit 12 for adjusting the occupied frequency bandwidth. The adjusting circuit 12 consists of a serial circuit comprising a resistor $r_1$ and an operational amplifier $A_1$, and a resistor $r_2$ connected between the output and input terminals of the operational amplifier $A_1$ to form a feedback circuit. Outputs from the circuit 12 for adjusting the occupied frequency bandwidth are supplied to the input terminal of the double integrator 13. This double integrator 13 comprises a first integrating circuit wherein a resistor $r_3$ and operational amplifier $A_2$ are connected in series, and a condenser $C_1$ is connected between the output and input terminals of the operational amplifier $A_2$ to form an integrating circuit together with the resistor $r_3$, and also a second integrating circuit which is serially connected to the first integrating circuit and includes a resistor $r_4$, operational amplifier $A_3$ and condenser $C_2$.

Outputs from the double integrating circuit 13 are fed back to the center frequency adjusting circuit 14 and primary transducer 11. The center frequency adjusting circuit 14 consists of a variable resistor grounded at one end, the movable contact of which is connected through a resistor $r_5$ to the other input terminal of the operational amplifier $A_2$. At the output terminal of the operational amplifier $A_2$ is positioned an actuating circuit 15 comprising a variable resistor grounded at one end. The movable contact of the variable resistor is connected through a resistor $r_6$ to the input terminal of the operational amplifier $A_2$. One end of the condenser $C_3$ is connected to the connection point of the resistor $r_6$ and operational amplifier $A_1$ and the other end of the condenser $C_3$ is grounded.

Figure 6:
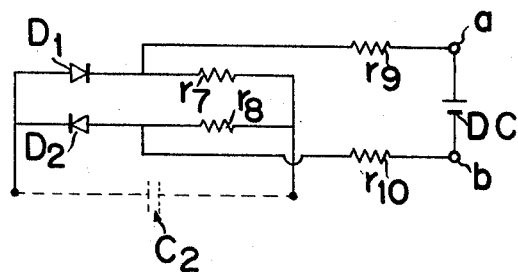
FIG. 6 represents an amplitude stabilizing circuit.

To both ends of the condenser $C_2$ of the second integrating circuit is connected an amplitude stabilizing circuit 16. This amplitude stabilizing circuit 16 consists of, for example, a bridge circuit as shown in FIG. 6 wherein the group of diode $D_1$ and resistor $r_7$ and the group of diode $D_2$ and resistor $r_8$ are respectively positioned on either side of the bridge and these groups are connected through the respective resistors $r_9$ and $r_{10}$ to the respective terminals $a$ and $b$ of a source of direct current, and the output terminal of the bridge circuit is connected to the condenser $C_2$ of the second integrating circuit.

The gain $\Delta\beta$ of the primary transducer 11 is determined by the ratio of the output $e_2$ from said transducer 11 to the signal $e_1$ issued from the oscillator, and can be controlled in accordance with the measured valves.

On the other hand, the gain $\beta_0$ corresponding to the center frequency $f_0$ can be defined by sliding to any desired position the movable contact of the variable resistor constituting the circuit for adjusting the center frequency and supplying the resultant output to the first integrator of the oscillator. Therefore the gain of the entire apparatus is determined jointly by the gain $\beta_0$ fixed by the oscillator itself, the gain $\Delta\beta$ of the primary transducer I provided in the external circuit of the oscillator and the gain $\mu$ of the other circuit including an operational amplifier, so that the upper limit of the occupied frequency bandwidth can be controlled by the external circuit of the oscillator (i.e., by adjusting the gain $\mu$ of circuit 12) independently of the center frequency.

The actuating circuit 15 is intended to cause oscillation to be easily started, and the amplitude stabilizing circuit 16 is used in controlling increases in the amplitude of the output from the second integrating circuit.

The aforementioned circuit arrangement of the present invention can independently control the center frequency and occupied frequency bandwidth, which are defined by the measured amounts, without any effect on either of these factors. This eliminates the necessity of using a complicated circuit system such as the conventional type, renders the entire apparatus compact and of lightweight and permits easy replacement of the parts thereof. Due to the aforementioned merits, the apparatus of the present invention is well adapted for use in telemeters to indicate ocean conditions, weather conditions, and outer space conditions so as to help the progress in these studies.

What we claim is:

1. A feedback-type oscillator apparatus for remote measurement comprising:

a variable gain transducer, the gain of which is variable in accordance with inputs thereto which correspond to values which are to be remotely measured;

a first coefficient adjuster coupled to an output of said variable gain transducer and adapted to adjust the occupied frequency bandwidth of the measurement apparatus;

a double integrator coupled to the output of said first coefficient adjuster, said double integrator including serially connected first and second integrator units;

a second coefficient adjuster coupling an output of said double integrator to an input of said first integrator unit, said second coefficient adjuster adjusting the center frequency of the measurement apparatus independent of the occupied frequency bandwidth; and a feedback circuit for feeding back an output signal of said double integrator to said variable gain transducer for stabilizing the variations of gain of said variable gain transducer produced by the variations of said values being remotely measured.

2. Apparatus according to claim 1 wherein said first coefficient adjuster includes a series circuit which comprises a resistor coupled to the output of said variable gain transducer connected in series with an operational amplifier, the output of the operational amplifier being coupled to said double integrator.

3. Apparatus according to claim 1 wherein each of said integrator units included in said double integrator comprises an operational amplifier, a resistor series connected thereto, and a condenser connected in parallel with the respective operational amplifier.

4. Apparatus according to claim 1 wherein said second coefficient adjuster includes a variable resistor coupling an output from said double integrator to an input terminal of said first integrator unit.

5. Apparatus according to claim 2 wherein said second coefficient adjuster includes a variable resistor coupling an output from said double integrator to an input terminal of said first integrator unit.

6. Apparatus according to claim 3 wherein said second coefficient adjuster includes a variable resistor coupling an output from said double integrator to an input terminal of the operational amplifier of said first integrator unit.

7. Apparatus according to claim 3 further comprising: an actuating circuit for facilitating initial oscillation, said actuating circuit including a variable resistor coupled between the output and input terminals of the operational amplifier of said first integrator unit; and an amplitude stabilizing circuit coupled between the terminals of the condenser of said second integrator unit.